United States Patent [19]

Humbs et al.

[11] Patent Number: 4,688,692

[45] Date of Patent: Aug. 25, 1987

[54] JOINING APPARATUS FOR SHEET METAL ASSEMBLY OF APPLIANCE HOUSINGS

[75] Inventors: Rolf Humbs; Gerhard Stempfl, both of Munich, Fed. Rep. of Germany

[73] Assignee: Siemens Aktiengesellschaft, Berlin and Munich, Fed. Rep. of Germany

[21] Appl. No.: 713,121

[22] Filed: Mar. 18, 1985

[30] Foreign Application Priority Data

Mar. 30, 1984 [DE] Fed. Rep. of Germany ....... 3411914

[51] Int. Cl.[4] .............................................. H02G 3/08

[52] U.S. Cl. ..................................... 220/3.8; 220/394; 220/315; 220/322

[58] Field of Search ...................... 220/323, 322, 3.94, 220/3.92, 3.8, 3.4, 3.2, 3.3, 3.5, 3.6, 3.7, 4 F, 315

[56] References Cited

U.S. PATENT DOCUMENTS

| | | | |
|---|---|---|---|
| 380,219 | 3/1888 | Roberts | 220/323 |
| 851,597 | 4/1907 | Paugh | 220/3.8 |
| 854,046 | 5/1907 | Paugh | 220/3.8 |
| 1,220,085 | 3/1917 | Freeman | 220/323 |
| 2,630,477 | 3/1953 | Rypinski | 220/3.3 |
| 2,877,919 | 3/1959 | Kobryner | 220/3.8 |
| 3,127,047 | 3/1964 | Bolchalk | 220/3.7 |
| 3,394,909 | 7/1968 | Pilla | 220/3.6 |
| 4,147,276 | 4/1979 | Jordan, Jr. | 220/323 |

FOREIGN PATENT DOCUMENTS

| | | |
|---|---|---|
| 2629547 | 1/1978 | Fed. Rep. of Germany . |
| 2945842 | 8/1979 | Fed. Rep. of Germany . |
| 2945642 | 5/1981 | Fed. Rep. of Germany . |

*Primary Examiner*—Joseph Man-Fu Moy
*Attorney, Agent, or Firm*—Mark H. Jay

[57] ABSTRACT

Apparatus for joining sheet metal elements of a housing for an electrical appliance has a centering lug, disposed on a first sheet metal element, with a wedgeshaped recess formed therein. Furthermore, disposed on a second sheet metal element is a centering hole to seat the centering lug, the latter penetrating the centering hole, but limited by a stop, until the top surface of the second sheet metal element with the centering hole and a bevel of the wedgeshaped recess form a wedgeshaped seating hole with a self-locking aperture angle for seating a spring wire elastically engaging the seating hole.

6 Claims, 5 Drawing Figures

JOINING APPARATUS FOR SHEET METAL ASSEMBLY OF APPLIANCE HOUSINGS

BACKGROUND OF THE INVENTION

1. Technical Field

This invention relates to the field of sheet metal assembly, and more particularly to apparatus for the joining of metal sides of a housing for electrical appliances such as a computer output printer.

2. Description of the Prior Art

In printing devices such as computer output printers, typewriters or tele-typewriters, a printing carriage is generally moved along a record carrier by an electrical drive mechanism. The typing carriage is mounted on guide rails which, in turn, are disposed in a printer support a in non-twisting and shape-stable manner. The printer support is often of boxshaped design and composed of individual sheet metal elements produced by stamping.

To interconnect or join the sheet metal elements, it is known in printing devices and other mechanical precision equipment subjected to severe stresses due to vibrations, to weld or screw the sheet metal elements together. But these joining methods are expensive and are used only when extreme stresses are involved. The also possible, cheaper methods, namely to peen over or to joggle the sheet metal elements have the disadvantage that the form closure at the joints is not perfect so that a loose connection may occur. The above-described joining methods, except the use of sheet metal screws, have the further disadvantage that after assembling or joining the sheet metal elements together, their disassembly, as may be required for servicing, is difficult or even impossible.

Another problem when joining sheet metal elements which serve as housing parts for printing devices or other electrical appliances is electromagnetic incompatability. Since the housing elements of such apparatus generally carry ground potential for safety reasons, it must be insured that the sheet metal elements are well connected to each other electrically.

SUMMARY OF THE INVENTION

It is an object of the invention to provide a device to join sheet metal elements so that it is possible to assemble the sheet metal parts rigidly and free of play without the connection loosening up in the event of vibrations. These problems are solved in the present apparatus for joining sheet metal elements of an electrical appliance housing.

The invention is based on the principle of coordinating the sheet metal elements in form-closing manner, but retaining the elements in force-closing manner only. For this purpose, a centering lug with a wedge-shaped recess is provided on one sheet metal element, and on the other sheet metal element a corresponding centering hole is provided. The centering lug is pushed through the centering hole while a spring steel wire is inserted in a wedgeshaped seating hole thus created between the surface of the one sheet metal part and a bevel of the wedge-shaped recess. The inclination of the bevel is toward the vertex of a selflocking angle so that in case the entire device vibrates, the sheet metal elements do not separate. On the contrary, they are clamped tighter and tighter together. Due to the wedge principle used, free space that would otherwise be present between sheet metal parts due possibly to their uneven machining is automatically eliminated, for instance, so that the connection does not loosen when subjected to vibration stresses, but is braced tighter and tighter through a kind of servo effect.

Despite this firm connection, the sheet metal elements can easily be separated from each other, e.g. for service purposes, by pivoting the spring wire out of the wedge-shaped recesses. The device according to the invention results in low manufacturing costs, simple assembly of the sheet metal elements to each other without holding fixtures, and easy disassembly.

The sheet metal elements can undergo an inexpensive surface coating because there is no danger of damaging the surface coating by welding, etc. The wall elements, hereinafter called sheet metal elements, may also consist of plastic which, with regard to its strength, must then be designed so that at least in the area of the centering lugs, no deformation of the wedgeshaped recess will take place when the spring wire is clamped into place.

Embodiments of the invention are shown in the drawing and described in greater detail by way of example.

DETAILED DESCRIPTION

Figure 1:
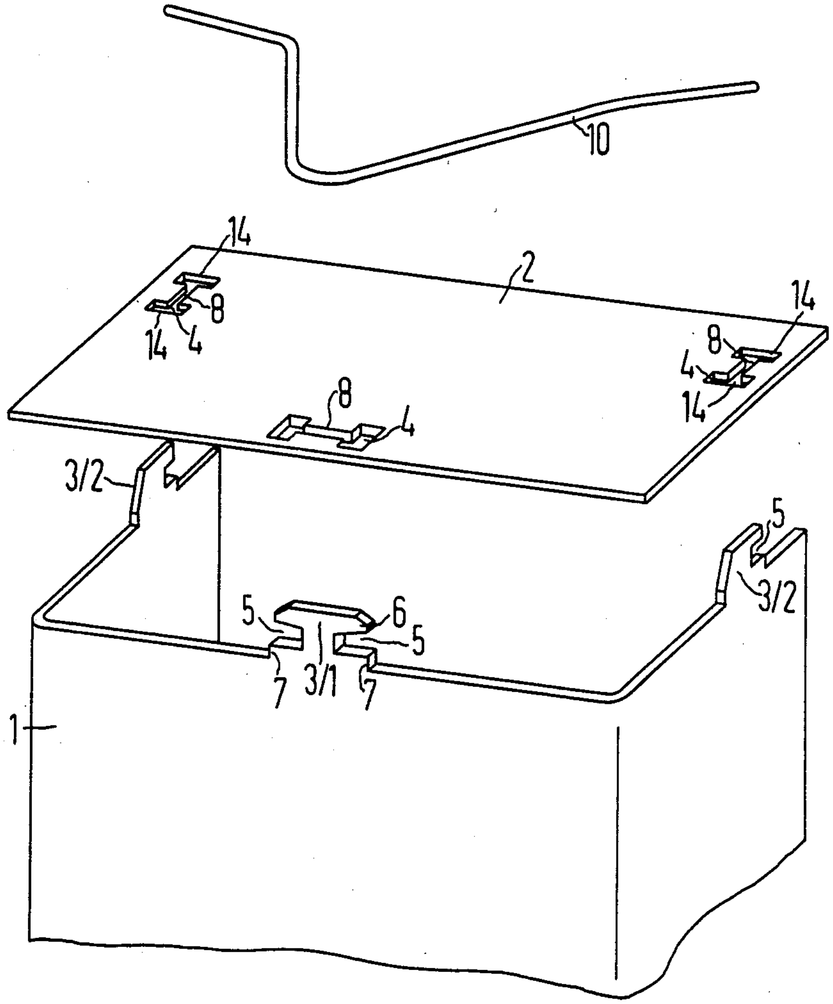
FIG. 1 is an exploded perspective view of an appliance housing showing the joining apparatus according to the present invention.

In a housing for an electrical appliance such as a computer output printer, not detailed here, support to hold the printing carriage is shown in FIG. 1. This printing support consists of a first sheet metal element 1 produced by stamping and other, second sheet metal elements 2 serving as side elements. The first sheet metal element 1 has at its sidewall centering lugs 3 interacting with corresponding centering holes 4 in the second sheet metal element.

The centering lugs 3, beveled on top for easier introduction into the centering hole 4, have wedgeshaped recesses 5, at least one side-surface 6 of the wedge-shaped recess 5 being designed as a bevel in the vicinity of the centering lugs 3 where they penetrate the centering holes 4.

Figure 2:
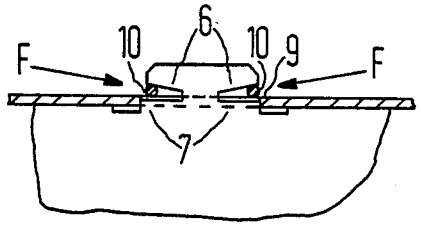
FIG. 2 is a sectioned view of the appliance housing of FIG. 1 in assembled state.

According to FIG. 2, the base of the centering lugs 3 has locating parts 7 or is shaped as such. When joining the first and second sheet metal elements, these locating parts 7 engage a matching locating slot 8 of the centering hole and is guided by this locating slot 8 laterally without play.

Referring to both FIG. 1 and FIG. 2, the length of the centering lugs is designed so that, in the assembled state, the upper portions of the centering lugs 3 protrude through the centering holes to such an extent that the top surface 9 of the sheet metal element 2 with the centering hole 4 and the bevel 6 of the wedgeshaped recess 5 form a wedgeshaped seating hole with a self-locking aperture angle for a spring wire 10 elastically engaging the seating hole.

Figure 3:
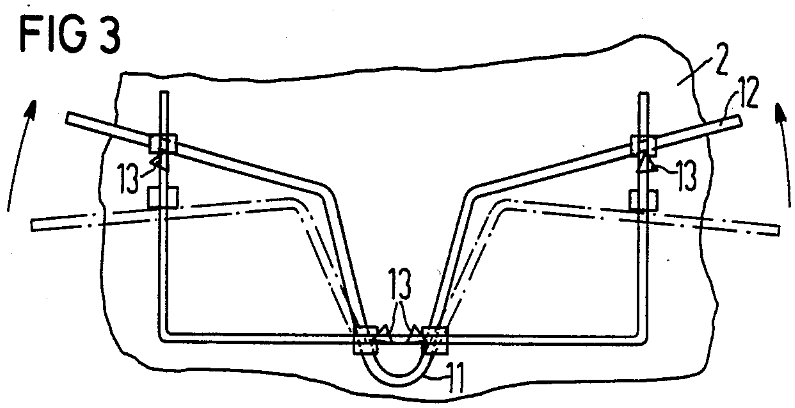
FIGS. 3, 4 and 5 show various embodiments of the joining apparatus according to the present invention.

The spring wire 10, consisting, for example, of spring steel wire, is prebent in a V shape in its normal position (shown dash-dotted) according to FIG. 3, and in order to connect the sheet metal elements 1 and 2, its V-shaped part 11 is pushed over the centering lug 3/1 which has two wedgeshaped recesses 5 so as to grip around the centering lug like a clamp. Then the legs 12 of the spring wire 10 are swung toward the top of FIG. 3 according to the arrow direction shown and locked in the recesses 5 of the centering lugs 3/2. Due to its spring action, the spring wire 10 now pushes the sheet metal element 2 against the sheet metal element 1 via the bevel 6. The inclination of the bevel 6 is designed so as to be toward the vertex of the self-locking angle, whereby any air space occurring because of uneven machining between the sheet metal parts is automatically eliminated. The connection is made tighter and tighter by the spring wire 10 through a kind of servo effect under vibratory stress. Thus, according to FIG. 3, the sheet metal element 2 is firmly joined to the recesses of the centering lugs 3/2 and 3/1 through the clamping points 13.

In the embodiments of the device shown in FIGS. 1 through 3, there are provided on the centering holes 4 transverse openings 14 with sharp edges, running perpendicular to the locating slot 8 and located in the spring wire seating area. On the one hand, the transverse openings 14 facilitate producing the seating hole 8 by stamping, resulting in an unequivocally defined length of the locating slot 8, and, on the other hand, the transverse openings 14 have sharp edges which make contact with the spring wire 10 and lead to a good electrical connection between the two sheet metal parts 1 and 2. To obtain optimal electromagnetic compatability, this electrically conducting connection between the sheet metal elements is necessary.

Figure 4:
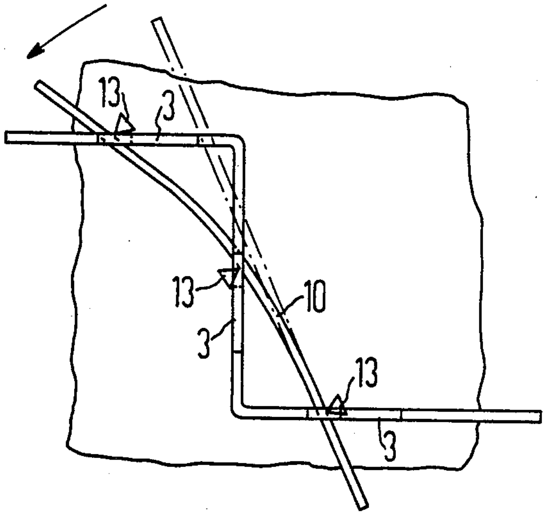

There is a multiplicity of possibilities for the design of the joining apparatus and, in particular, for the arrangement of the centering lugs with their matching centering holes on the sheet metal elements. For instance, in one design of the device according to FIG. 4, three centering lugs with only one centering hole each are arranged at an angle to each other. An oblong spring wire is first inserted (dash-dotted lines) into the wedgeshaped recess of the lower centering lug 3 and then swung out of its position at rest according to the arrow direction, to be locked in the recess of the upper centering hole 3. At the same time, the central portion of the spring wire also engages the recess of the centrally located centering lug.

Figure 5:
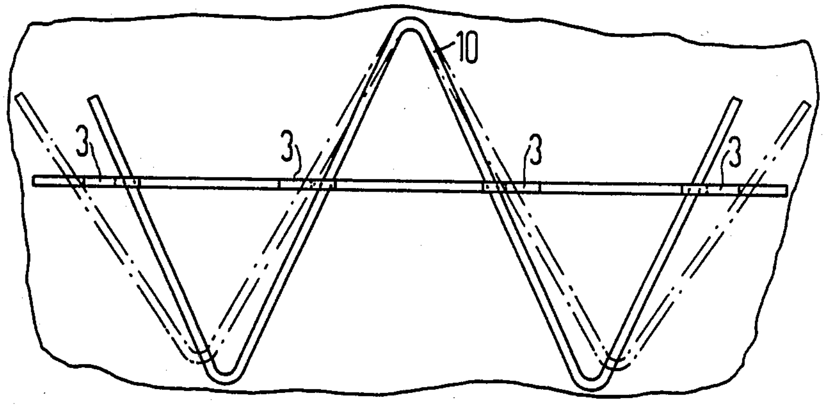

If, according to the embodiment of FIG. 5, four centering lugs are arranged in a row, each having only one centering hole, the spring wire 10 may accordingly be of W-shape. When assembling the device, it is then swung out of its position at rest, shown dash-dotted, into its working position and clamped between in the wedgeshaped recesses. Instead of using a continuous spring wire clamped between several recesses it is also possible, for instance, to connect one end of the spring wire permanently to the sheet metal element 2 and only swing its free end into a recess of the centering lug.

If two recesses 5 are provided on a centering lug according to the centering lug 3/1, the spring wire may be V-shaped and grip around the centering lug in the manner of a clamp.

In the embodiments of the device illustrated, the centering lugs form part of the sheet metal elements. It is also possible, however, to use, instead of the sheet metal elements, plastic elements with their centering lugs or centering holes molded in. The strength properties of the plastic must then be such that no deformation occurs in the area of the wedgeshaped recess when inserting the spring wire. If the type of plastic is properly selected, the spring wire itself may also consist of plastic.

In the exemplary embodiments shown, the sheet metal elements including their centering lugs and centering holes are produced as integral parts by stamping. It is also possible, however, to produce the centering lugs and the centering holes separately and then fasten them to the appropriate elements.

What is claimed is:

1. Apparatus for joining wall elements of a housing for an electrical appliance comprising a spring wire, a centering lug disposed on a first wall element, the centering lug having a wedgeshaped recess and a centering hole disposed on a second wall element for seating the centering lug, the centering lug penetrating through the centering hole but limited by a stop, the top surface of the second wall element forming a self-locking aperture angle with the wedgeshaped recess for seating the spring wire to elastically engage the sides of the self-locking aperture angle, the spring wire being mounted to exert a force in a direction that is substantially parallel to the top surface of the second wall element.

2. Apparatus according to claim 1, wherein the spring wire is clamped between at least two self-locking aperture angles of at least one centering lug.

3. Apparatus according to claim 2, wherein a wedgeshaped recess is disposed on each of two sides of a centering lug, the spring wire gripping the centering lug by means of first and second self-locking aperture angles.

4. Apparatus according to claim 1, wherein the centering hole has a locating slot running lengthwise which is engaged by a locating part formed at the base of the centering lug.

5. Apparatus according to claim 4, wherein the centering hole has transverse openings with sharp edges extending perpendicular to the locating slot, the transverse openings provided at the end of the locating slot in the seating area of the spring wire.

6. A housing for an electrical appliance comprising a spring wire, a first wall element having joining apparatus comprising at least one centering lug with at least one wedgeshaped recess and a second wall element having joining apparatus comprising at least one centering hole, the centering lug penetrating the centering hole but limited by a stop, the top surface of the second wall element forming a self-locking aperture angle with a side of the wedgeshaped recess of the first wall element, the self-locking aperture angle for seating the spring wire to elastically engage the sides of the self-locking aperture angle, the first and second wall elements and associated joining apparatus each being produced by stamping from a single sheet, the spring wire being mounted to exert a force in a direction that is substantially parallel to the top surface of the second wall element.

* * * * *